United States Patent
Katayama et al.

(10) Patent No.: US 12,493,961 B2
(45) Date of Patent: Dec. 9, 2025

(54) ESTIMATION DEVICE, ESTIMATION METHOD, PROGRAM, AND GENERATION METHOD

(71) Applicant: MEDICAL CORPORATION KATAYAMA ORTHOPEDIC RHEUMATOLOGY CLINIC, Asahikawa (JP)

(72) Inventors: Kou Katayama, Hokkaido (JP); Kensaku Mori, Aichi (JP); Masahiro Oda, Aichi (JP); Dongping Pan, Aichi (JP)

(73) Assignee: MEDICAL CORPORATION KATAYAMA ORTHOPEDIC RHEUMATOLOGY CLINIC, Hokkaido (JP)

( * ) Notice: Subject to any disclaimer, the term of this patent is extended or adjusted under 35 U.S.C. 154(b) by 351 days.

(21) Appl. No.: 18/025,746

(22) PCT Filed: Sep. 15, 2021

(86) PCT No.: PCT/JP2021/033957
§ 371 (c)(1),
(2) Date: Mar. 10, 2023

(87) PCT Pub. No.: WO2022/059713
PCT Pub. Date: Mar. 24, 2022

(65) Prior Publication Data
US 2023/0419493 A1 Dec. 28, 2023

(30) Foreign Application Priority Data
Sep. 15, 2020 (JP) ................. 2020-154719

(51) Int. Cl.
*G06K 9/00* (2022.01)
*G06T 7/00* (2017.01)

(52) U.S. Cl.
CPC .. *G06T 7/0014* (2013.01); *G06T 2207/10116* (2013.01); *G06T 2207/20081* (2013.01); *G06T 2207/30008* (2013.01)

(58) Field of Classification Search
CPC ......... G06T 7/0014; G06T 2207/10116; G06T 2207/20081; G06T 2207/30008;
(Continued)

(56) References Cited

U.S. PATENT DOCUMENTS 8,290,564 B2 * 10/2012 Lang ..................... G06T 7/0012
600/407
11,471,096 B2 * 10/2022 Griffith ................ A61B 5/4523
(Continued)

FOREIGN PATENT DOCUMENTS

JP  2016-41245  3/2016

OTHER PUBLICATIONS

Hirvasniemi J, Niinimäki J, Thevenot J, Saarakkala S. Bone Density and Texture from Minimally Post-Processed Knee Radiographs in Subjects with Knee Osteoarthritis. Ann Biomed Eng. May 2019;47(5):1181-1190. doi: 10.1007/s10439-019-02227-y. Epub Feb. 14, 2019. PMID: 30767134; PMCID: PMC6453872 (Year: 2019).*

(Continued)

*Primary Examiner* — Atiba O Fitzpatrick
(74) *Attorney, Agent, or Firm* — Wenderoth, Lind & Ponack, L.L.P.

(57) ABSTRACT

A purpose of the present invention is to make it possible, when diagnosing bone marrow edema, to estimate whether bone marrow edema is present in a body part of a subject without using MRI testing using a high-cost MRI device. The present invention is an estimation device that includes a learner that is trained using X-ray images in which the body part is photographed, and learning data including information about whether the body part photographed in
(Continued)

the X-ray image has bone marrow edema, the X-ray image in which the body part of the subject is photographed being inputted into the learner, and an estimation result being outputted that relates to the presence of bone marrow edema in the body part photographed in the inputted X-ray image.

8 Claims, 4 Drawing Sheets

(58) Field of Classification Search
CPC . G06T 2207/20084; G06T 2207/30096; G06T 7/0012; G06T 9/002; G06T 5/60; G06T 2207/10081; G06T 2207/10121; G06T 2207/10124; G06T 2207/10128; A61B 6/505; A61B 6/5217; A61B 6/03; A61B 6/032; A61B 6/025; A61B 6/484; A61B 2090/376; G16H 30/40; G16H 50/20; G16H 50/30; G06K 9/6256; G06K 9/6257; G06K 9/6259; G06V 10/70; G06V 10/82; G06V 10/774–7796; G06V 10/454; G06N 3/02–126; G06N 20/00–20; G06F 18/214–2155; G06F 7/023; G06F 40/16; G01N 29/4481
See application file for complete search history.

(56) References Cited

U.S. PATENT DOCUMENTS

| | | | | |
|---|---|---|---|---|
| 2004/0242987 | A1* | 12/2004 | Liew | A61B 8/5223 600/407 |
| 2013/0195325 | A1* | 8/2013 | Lang | G01N 23/046 382/128 |
| 2016/0048961 | A1 | 2/2016 | Mohr et al. | |
| 2017/0360473 | A1 | 12/2017 | Hanson et al. | |
| 2018/0360858 | A1* | 12/2018 | Tabuteau | A61K 31/663 |
| 2019/0021677 | A1* | 1/2019 | Grbic | G06T 7/11 |
| 2020/0129114 | A1* | 4/2020 | Griffith | A61B 5/459 |

OTHER PUBLICATIONS

International Search Report issued Dec. 14, 2021 in International Application No. PCT/JP2021/033957.
Colebatch et al., "EULAR recommendations for the use of imaging of the joints in the clinical management of rheumatoid arthritis", Ann Rheum Dis, 2013, vol. 72, pp. 804-814.
Fukae et al., "Convolutional neural network for classification of two-dimensional array images generated from clinical information may support diagnosis of rheumatoid arthritis", Scientific Reports, 2020, vol. 10, pp. 1-7.
Office Action issued Aug. 17, 2021 in corresponding Japanese Patent Application No. 2020-154719, with English machine translation.
Katayama et al. "11.X-ray radiograph characteristic of extensive bone marrow edema in hand joint", 2019, vol. 94(1), pp. 61, with English translation.
Extended European Search Report issued Sep. 12, 2024 in corresponding European Patent Application No. 21869399.2.
Kento Morita et al., "Computer-Aided Diagnosis System for Rheumatoid Arthritis Using Machine Learning", 2017 International Conference on Machine Learning and Cybernetics (ICMLC), IEEE, vol. 2, Jul. 2017, pp. 357-360, XP033255742, DOI:10.1109/ICMLC.2017.8108947, ISBN: 978-1-5386-0406-9, [retrieved on Nov. 14, 2017].
Katayama et al. "11.X-ray radiograph characteristic of extensive bone marrow edema in hand joint", 2019, vol. 91, No. 1, pp. 61, with English translation.

* cited by examiner

ESTIMATION DEVICE, ESTIMATION METHOD, PROGRAM, AND GENERATION METHOD

TECHNICAL FIELD

The present invention relates to an estimation device, an estimation method, a program, and a generation method.

BACKGROUND ART

Rheumatoid arthritis (RA) is the most common inflammatory arthritis, affecting an estimated 1% of the global population. Continued inflammation gradually destroys cartilage and bone, resulting in joint destruction and eventual loss of function as a joint, and therefore the development of effective treatment methods has been promoted. The etiology of the disease itself remains largely unknown, but in recent years, significant therapeutic improvements have been achieved with the advent of effective treatments such as methotrexate (MTX), an immunosuppressive agent, and new biologics (BIOs). However, in some patients, the progression of joint destruction may be significantly rapid, and the need for early diagnosis and early treatment is also recognized.

Diagnostic imaging methods are widely used to diagnose rheumatoid arthritis, and diagnostic imaging methods are being improved further for early diagnosis. Examples of known diagnostic imaging methods include X-rays, joint ultrasound, and magnetic resonance imaging (MRI). With X-rays, intra-articular bone erosion, joint space narrowing, and the like are observed, and due to its low sensitivity, the results of joint destruction are often seen. Joint ultrasound and MRI allow for observation of inflammation in the joint at an early stage before joint destruction. In particular, MRI is known as the only diagnostic imaging method that also enables observation of bone marrow edema (BME) which is an inflammatory lesion in bone marrow. Thus far, there have been no reports of successful observation of bone marrow edema using X-rays.

Here, bone marrow edema is an inflammatory lesion in bone marrow, and bone marrow edema is known to indicate the possibility of future joint destruction in patients with rheumatoid arthritis. Recently, bone marrow edema has been recommended as a strong independent prognostic predictor of joint destruction in early rheumatoid arthritis in the diagnostic imaging section of the European League Against Rheumatism Congress 2013 (Non Patent Literature 1). It has also been reported that early administration of biologics in rheumatoid arthritis patients with bone marrow edema suppressed the bone marrow edema and inhibited the progression of joint destruction.

On the other hand, attempts to utilize AI in the diagnosis of rheumatoid arthritis are making progress. For example, in Non Patent Literature 2, a convolutional neural network is used to classify rheumatoid arthritis and non-rheumatoid arthritis on the basis of clinical information.

PRIOR ART DOCUMENTS

Non Patent Document

Non Patent Document 1: Colebatch A N, Edwards C J, Ostergaard M, et al. EULAR recommendations for the use of imaging of the joints in the clinical management of rheumatoid arthritis. Ann Rheum Dis, 2013; 72: 804-814.

Non Patent Document 2: Fukae J, Isobe M, Hattori T, et al. Convolutional neural network for classification of two-dimensional array images generated from clinical information may support diagnosis of rheumatoid arthritis. Scientific reports, 2020; 10: 1-7.

SUMMARY OF INVENTION

Technical Problem

As seen thus far, early diagnosis and early treatment of bone marrow edema are important for inhibiting joint destruction in rheumatoid arthritis, but at present, bone marrow edema can only be diagnosed by MRI using an expensive MRI machine. Furthermore, conducting an MRI is generally costly and an economic burden for many patients around the world.

Accordingly, an objective of the present invention is to make it possible, when diagnosing bone marrow edema, to estimate whether bone marrow edema is present in body part of a subject without conducting an MRI using an expensive MRI machine.

Solution to Problem

Over the years, the present inventors have made numerous comparative observations of X-ray images of joints and the like with and without bone marrow edema, and have discovered that irregularly shaped images suggesting a correlation with bone marrow edema may possibly exist in X-ray images. Furthermore, the inventions have discovered that by using machine learning such as deep learning, the presence or absence of bone marrow edema can be estimated from an X-ray image of a joint or the like.

That is, the gist of the present invention lies in an estimation device including a learner that has been trained using training data including X-ray images of body part and information about whether or not bone marrow edema is present in body part captured in each of the X-ray images, wherein the estimation device inputs an X-ray image of body part of a subject into the learner, and outputs an estimation result related to a presence or absence of bone marrow edema in body part captured in the inputted X-ray image.

Also, the gist of the present invention lies in a method for estimating a presence or absence of bone marrow edema in body part captured in an X-ray image, the method including an estimating step of inputting an X-ray image of body part of a subject into a learner that has been trained using training data including X-ray images of body part and information about whether or not bone marrow edema is present in body part captured in each of the X-ray images, and outputting an estimation result related to a presence or absence of bone marrow edema in body part captured in the inputted X-ray image.

Also, the gist of the present invention lies in a program causing a computer to function as a learner that has been trained using training data including X-ray images of body part and information about whether or not bone marrow edema is present in body part captured in each of the X-ray images, wherein the trained learner accepts an X-ray image of body part of a subject as input, and outputs an estimation result related to a presence or absence of bone marrow edema in body part captured in the inputted X-ray image.

Also, the gist of the present invention lies in a generation method for generating a trained learner that can estimate a presence or absence of bone marrow edema in body part captured in an X-ray image, the generation method including a training step of training the learner using training data including X-ray images of body part and information about whether or not bone marrow edema is present in body part captured in each of the X-ray images.

Advantageous Effects of Invention

According to the present invention, it is possible to estimate whether bone marrow edema is present in body part of a subject on the basis of an X-ray image of body part of the subject, without conducting an examination using an MRI machine.

DESCRIPTION OF EMBODIMENTS

Figure 1:
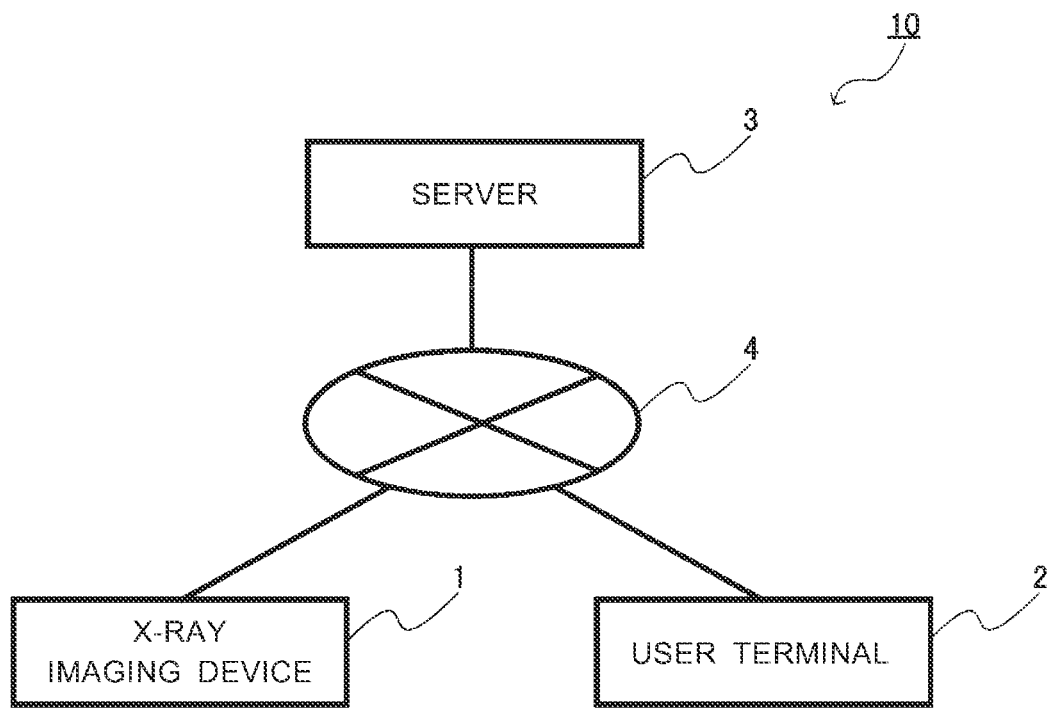
FIG. 1 is a block diagram illustrating an example of a configuration of an estimation system according to the first embodiment.

In the present invention, "bone marrow edema" is used in the ordinary meaning well known to a person skilled in the art, and typically refers to diffuse intraosseous areas with irregular edges which are depicted as low signal in MRI T1-weighted images, or as high signal in T2-weighted, fat-suppressed or STIR images, and which appear in conditions such as degenerative diseases (osteoarthritis) and inflammatory diseases (rheumatoid arthritis, spondyloarthritis, enthesitis).

In the present invention, the bone marrow edema that can be handled preferably is bone marrow edema associated with inflammatory disease (histology: inflammatory cells, osteoclasts). Among these, bone marrow edema associated with rheumatoid arthritis or spondyloarthritis can be handled more preferably, and bone marrow edema associated with rheumatoid arthritis can be handled particularly preferably.

In the present invention, there are no restrictions on body part to be targeted for estimation, and for example, in rheumatoid arthritis, body part may be joints of fingers, wrists (hands), hip, knees, ankles, and toes, while in spondyioarthritis, body part may be sacroiliac joints and periarticular ligamentous bone tissues such as vertebrae and Achilles tendons. Among these, joints of hands in rheumatoid arthritis and sacroiliac joints in spondyloarthritis are preferable examples, and joints of hands are a particularly preferable example. Moreover, joints of hands are preferable in light of their high frequency of occurrence in rheumatoid arthritis and from the standpoint of predicting joint destruction.

In the present invention, the estimation device is, for example, a computer. The estimation device includes, for example, a processor, and processing related to the estimation method is executed, for example, by the processor.

In the present invention, for example, the estimation device inputs an X-ray image of body part of a subject into a learner, and causes the learner to output an estimation result related to a presence or absence of bone marrow edema in body part captured in the inputted X-ray image. For example, the estimation device can cause the learner to output a probability that bone marrow edema is present in the joint of hand captured in the X-ray image.

In the present invention, for example, the estimation device can determine, on the basis of the above probability, whether bone marrow edema is or is not present in the joint of hand captured in the X-ray image. In this case, the estimation device of the present invention may also be thought of as a determination device, for example.

In the method of the present invention, for example, an estimating step involves inputting an X-ray image of body part of a subject into a learner, and causing the learner to output an estimation result related to a presence or absence of bone marrow edema in body part captured in the inputted X-ray image. For example, the estimating step can cause the learner to output a probability that bone marrow edema is present in the joint of hand captured in the X-ray image.

For example, the method of the present invention may further include a determining step for determining, on the basis of the above probability, whether bone marrow edema is or is not present in the joint of hand captured in the X-ray image. In this case, the method of the present invention may also be thought of as a determination method, for example.

Hereinafter, embodiments of the present invention will be described using FIGS. 1 to 4. The present invention is not limited to the following embodiments. In each of the following drawings, like portions are denoted with like signs. Also, the descriptions of each of the embodiments can cite each other, unless specifically otherwise noted.

First Embodiment

One example of the estimation device, estimation method, and generation method of the present invention is described hereinafter using the drawings. Note that the present embodiment is described by taking the joint of hand as an example of body part to be targeted for estimation, but as described above, the present invention is not limited thereto.

FIG. 1 is a block diagram illustrating an example of a configuration of an estimation system according to the first embodiment. Estimation system 10 includes X-ray imaging device 1, user terminal 2, and server 3 acting as the estimation device. X-ray imaging device 1, user terminal 2, and server 3 are each connected to communication network 4 and can each other over communication network 4. For communication network 4, a generally known communication network can be used, may be wired or wireless, and for example, a local area network (LAN) or Internet can be used. Also, in the present embodiment, one of each of X-ray imaging device 1 and user terminal 2 is installed, but a plurality of each may also be installed, for example.

X-ray imaging device 1 is a device for taking X-ray of the joint of hand of a subject, and is a general medical diagnostic X-ray imaging device (plain X-ray radiographic device). X-ray imaging device 1 is used to take an image of the joint of hand of the subject (patient) and acquire an X-ray image of the joint of hand to be estimated in the present embodiment, ordinarily in accordance with the interest of a medical doctor. Note that the X-ray images to be used as training data described later are also acquirable by this device.

X-ray imaging device 1 has a communication function, and a captured X-ray image of the joint of hand is transmitted to server 3.

Here, the X-ray image may be any image including the joint of hand of the subject. That is, the X-ray image of the joint of hand of the subject may also include, for example, body part other than the joint of hand of the subject, and may be taken over any imaging range. In diagnosis of the joint of hand, it is typical to take an X-ray image(s) over a wide range from the wrist to the fingertips, and estimation system 1 of the present embodiment can use such an X-ray image favorably.

User terminal 2 is a terminal used by a user. User terminal 2 may be a general computer, and be configured to include, for example, a control unit including a central processing unit (CPU), a graphics processing unit (CPU) and the like, a storage unit including a hard disk, read-only memory (ROM), random access memory (RAM) and the like, a communication unit including a network adapter and the like, a display unit including a liquid crystal display panel and the like, and an input unit including a keyboard, a mouse and the like. User terminal 2 can receive, from server 3 acting as the estimation device, an estimation result regarding a presence or absence of bone marrow edema in the joint of hand captured in an X-ray image. For example, a medical doctor can use user terminal 2 to check the above estimation result with respect to an X-ray image of a patient, and utilize this in patient diagnosis.

Note that in the present embodiment, user terminal 2 is installed separately from X-ray imaging device 1, but X-ray imaging device 1 and user terminal 2 may also be configured in a unified way, for example.

Figure 2:
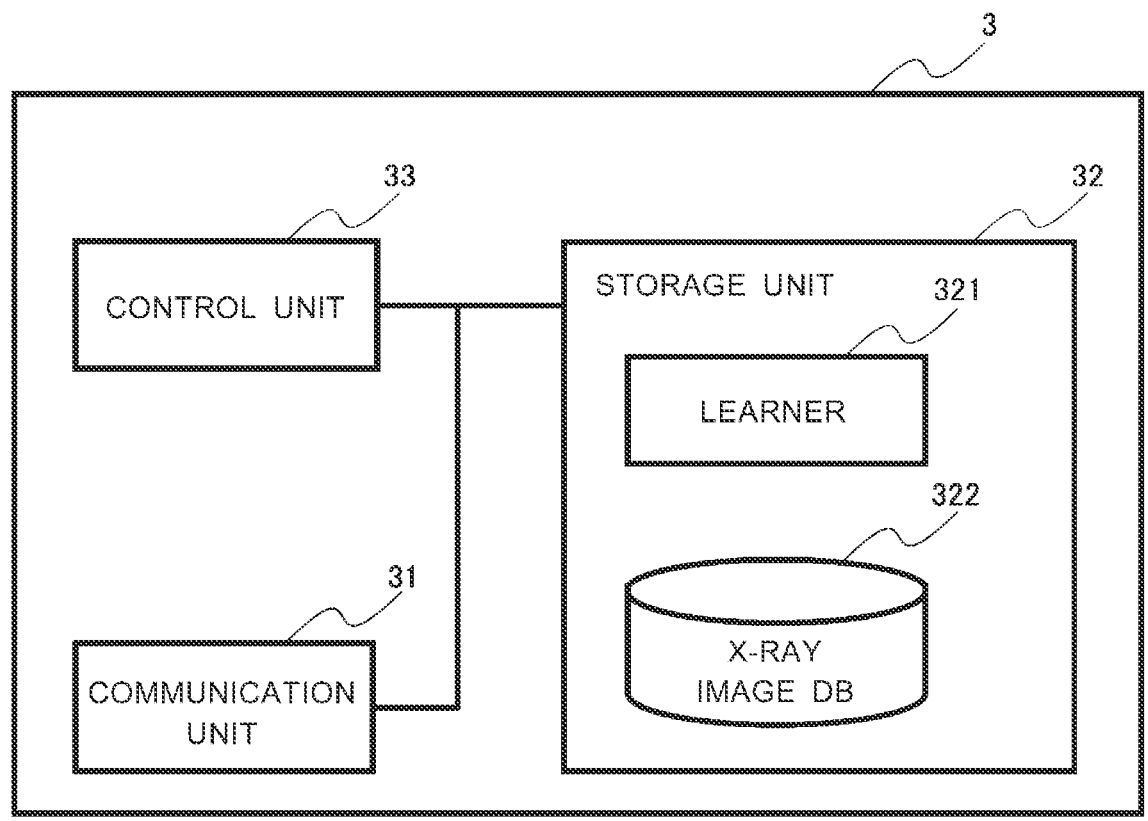
FIG. 2 is a block diagram illustrating an example of a configuration of a server according to the first embodiment.

Server 3 is formed from a computer with enough performance to be capable of functioning as a server. Server 3 functions as the estimation device of the present invention, and can perform processing for estimating a presence or absence of bone marrow edema with respect to an X-ray image of the joint of hand of the subject. FIG. 2 is a block diagram illustrating an example of the configuration of server 3. Server 3 includes communication unit 31, storage unit 32, and control unit 33, which are interconnected through an electrical circuit.

Communication unit 31 is configured to include a network adapter and the like, for example. Communication unit 31 communicates with other devices over communication network 4. For example, communication unit 31 receives, from X-ray imaging device 1, an X-ray image of the joint of hand of the subject. Communication unit 31 also transmits, to user terminal 2, an estimation result regarding a presence or absence of bone marrow edema in the joint of hand of the subject captured in the X-ray image.

Storage unit 32 is configured to include a hard disk, ROM, RAM, and the like. A processing program for causing each unit of server 3 to operate is saved in storage unit 32. Additionally, learner 321 and X-ray image DB 322 are saved in storage unit 32. The X-ray image of the joint of hand of the subject received from X-ray imaging device 1 may also be saved in the storage unit 32, for example.

Learner 321 will be described. Typically, learner 321 actually corresponds to a machine learning program (algorithm). In the present invention, learner 321 is trained so as to define the parameters being necessary for making an estimation regarding a presence or absence of bone marrow edema in body part of the subject captured in the X-ray image. Learner 321 may be any machine learning program (algorithm) that can be trained to make the above estimation, and for example, a convolutional neural network (CNN) can be used favorably. In the present embodiment, X-ray image DB 322 stores training data including a plurality of X-ray images of joints of hands and information about whether or not bone marrow edema is present in the joint of hand captured in each of the X-ray images, and by loading the training data stored in X-ray image DB 322 into learner 321 before the estimation process, a trained learner (that is, a trained model) is generated and then saved in storage unit 32.

Note that the above description assumes that the generation process for generating trained learner 321 and the estimation process using learner 321 are executed on the same computer, namely server 3, but these processes can be executed separately. Accordingly, for example, the generation of trained learner 321 may be performed on a separate computer, and trained learner 321 thus generated may be installed and used in server 3. That is, the estimation process described later can be performed as long as trained learner 321 is saved in storage unit 32, even if X-ray image DB 322 is not saved therein.

As described above, before the estimation process, learner 321 is saved as a trained learner that has been trained using training data including X-ray images of joints of hands and information about whether or not bone marrow edema is present in the joint of hand captured in each of the X-ray images. Thereafter, an X-ray image of the joint of hand of the subject, which is received from X-ray imaging device 1, is inputted as input data into trained learner 321, and trained learner 321 makes an estimation regarding a presence or absence of bone marrow edema in the joint of hand of the subject captured in the inputted X-ray image. For example, the inputted X-ray image is identified as joint of hand with bone marrow edema or joint of hand without bone marrow edema.

Figure 5:
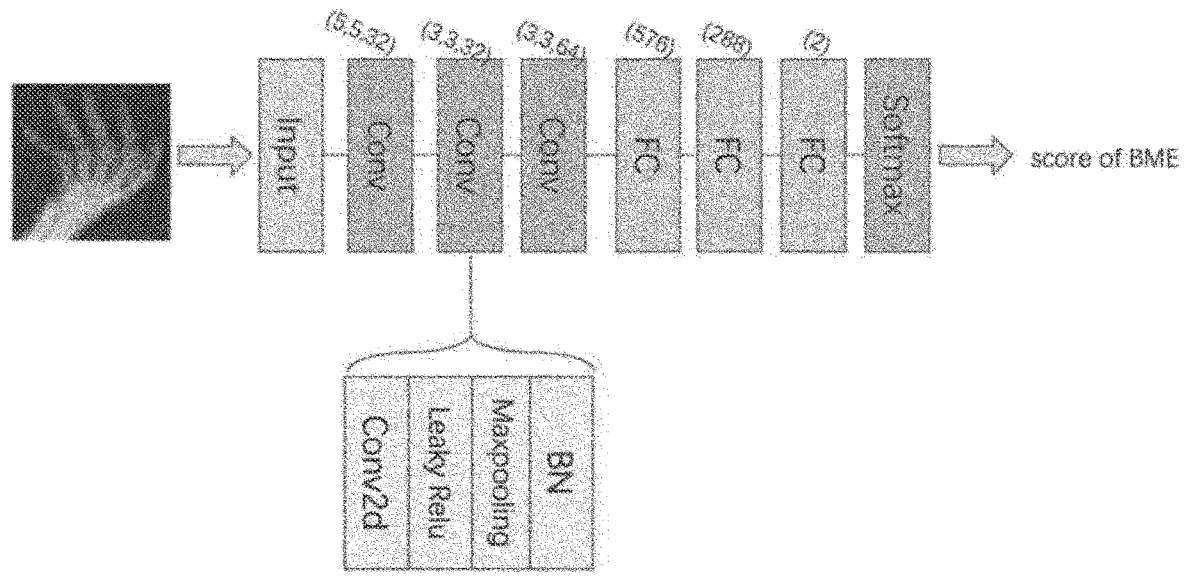
FIG. 5 is a schematic diagram illustrating the design of a convolutional neural network in Example 1.

An example of a specific configuration of learner 321 can be, for instance, the configuration of the convolutional neural network (see FIG. 5) in the example described below. However, the configuration of the convolutional neural network illustrated in FIG. 5 is one example, and the present embodiment is not limited thereto, Any configuration can be adopted insofar as the configuration functions as the learner according to the present invention.

Note that in the present embodiment, joint of hand is body part to be targeted for estimation, but the estimation device of the present invention is also capable of estimation regarding body parts other than joint of hand. Accordingly, for the purpose of estimation for body parts other than joint of hand, storage unit 32 may also store a plurality of trained learners in correspondence with body parts to be targeted for estimation, the learners having been generated using training data according to body parts.

Control unit 33 (for example, a processor) is configured to include a CPU, GPU, and the like. Control unit 33 controls each unit of server 3 according to the processing program stored in storage unit 32. Control unit 33 also functions as a learning processing unit and an estimation processing unit as below. That is, in the case of functioning as the learning processing unit, control unit 33 executes a processing sequence for generating a trained learner by loading training data stored in X-ray image DB 322 into learner 321. Also, in the case of functioning as the estimation processing unit, control unit 33 executes a processing sequence for inputting an X-ray image into trained learner 321 and outputting an estimation result.

Here, trained learner 321 can output a probability that bone marrow edema is present in the joint of hand captured in the X-ray image, for example. For example, the probability can be outputted as a score of bone marrow edema, for example, a score of bone marrow edema that takes a value in the range from 0 to 1.

In addition, server 3 can determine, on the basis of the above probability, whether bone marrow edema is or is not present in the joint of hand captured in the X-ray image, for example. When making the above determination, a predetermined threshold value can be used, for example. By appropriately setting the threshold value, bone marrow edema can be determined to be present when the above score exceeds the threshold value, or not to be present when the above score does not exceed the threshold value. Here, the threshold value can be chosen on the basis of any criteria suited to the purpose, and can be chosen on the basis of the F-measure, for example.

Also, the estimation device of the present invention can optionally include a visualization unit that analyzes the internal state of the learner and outputs an image visualizing a region of suspected abnormality in the inputted X-ray image. In this case, control unit 33 also functions as the visualization unit. In the case of functioning as the visualization unit, control unit 33 executes a processing sequence for analyzing the internal state of learner 321 and outputting an image visualizing a region of suspected abnormality in the inputted X-ray image.

Figure 3:
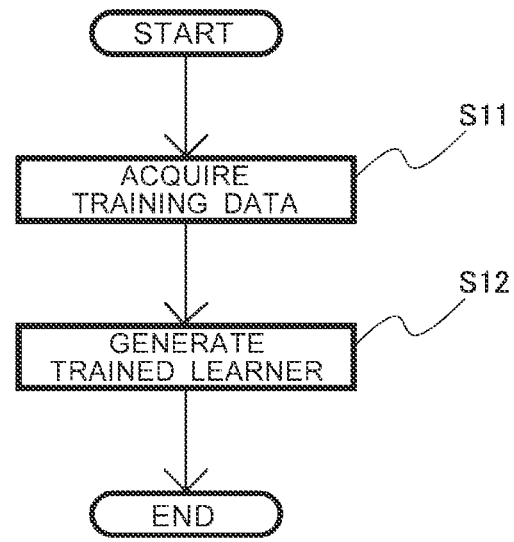
FIG. 3 is a flowchart illustrating an example of a trained learner generation method in the first embodiment.

Next, the generation method for generating trained learner 321 executed in server 3 will be described using the flowchart in FIG. 3. Note that the generation method of the present embodiment is not limited to this example.

First, control unit 33 acquires training data to be used to generate trained learner 321 (step S11). Specifically, control unit 33 reads out, from X-ray image DB 322, training data including a plurality of X-ray images of joints of hands and information about whether or not bone marrow edema is present in the joint of hand captured in each of the X-ray images.

Next, control unit 33 trains learner 321 using the above training data so as to generate trained learner 321 that, when given an X-ray image of joint of hand of a subject as input, outputs an estimation result regarding a presence or absence of bone marrow edema in the joint of hand of the subject captured in the X-ray image (step S12). At this time, control unit 33 saves trained learner 321 in storage unit 32 and ends the processing sequence.

Figure 4:
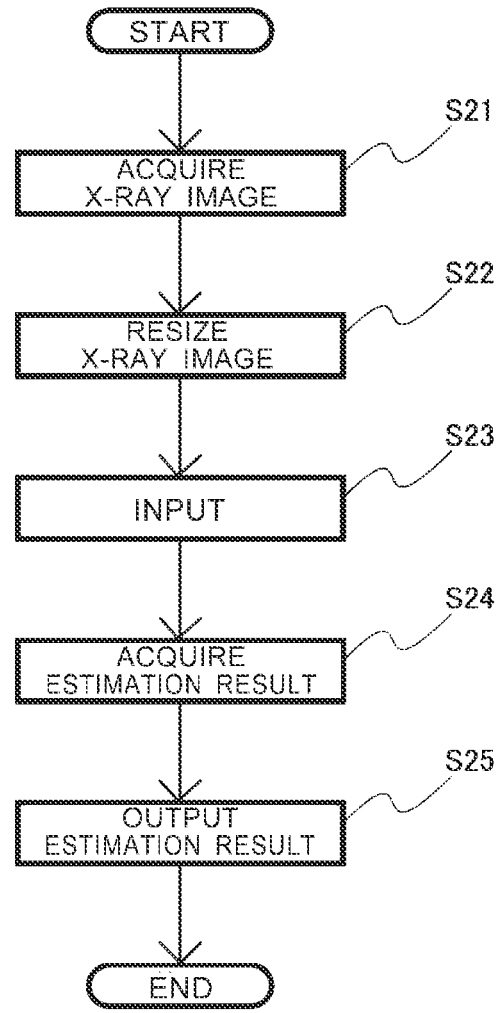
FIG. 4 is a flowchart illustrating an example of an estimation method in the first embodiment.

Next, the estimation method for an X-ray image executed in server 3 will be described using the flowchart in FIG. 4. Note that the estimation method of the present embodiment is not limited to this example.

First, control unit 33 acquires, from communication unit 31 or storage unit 32, an X-ray image of the joint of hand of the subject (step S21).

Next, control unit 33 resizes the X-ray image to a size suitable for input into trained learner 321 (step S22).

Next, control unit 33 inputs the resized X-ray image into trained learner 321 (step S23).

Next, control unit 33 acquires, as the output from trained learner 321, an estimation result regarding a presence or absence of bone marrow edema in the joint of hand of the subject captured in the X-ray image (step S24).

Next, control unit 33 outputs the estimation result to user terminal 2 (step S25) and ends the processing sequence. In the user terminal 2, the estimation result is displayed on the display unit.

Note that, in one example, when making trained learner 321 to output a probability that bone marrow edema is present in the joint of hand of the subject, control unit 33 can also determine, on the basis of the probability, that bone marrow edema is or is not present in the joint of hand captured in the X-ray image.

Also, the estimation method of the present invention can optionally include a visualizing step of analyzing the internal state of the learner and outputting an image visualizing a region of suspected abnormality in the inputted X-ray image. In this case, next, control unit 33 (visualization unit) analyzes the internal state of learner 321 and outputs an image visualizing a region of suspected abnormality in the inputted X-ray image. Here, a generally known method can be employed as the method for analyzing the internal state of learner 321 and outputting an image visualizing a region of suspected abnormality in the inputted X-ray image, and for example, Grad-CAM (see Selvaraju R R, Cogswell M, Das A, et al. Grad-cam: Visual explanations from deep networks via gradient-based localization. Proceedings of the IEEE international conference on computer vision. 2017: 618-626.) can be used because it allows for visualizing the importance of each region in the image with respect to the final prediction. Such an image visualizing a region of suspected abnormality is valuable information when a medical doctor diagnoses bone marrow edema, and can assist with the diagnosis by the medical doctor.

Note that although the above describes an example of an estimation system that includes an X-ray imaging device, a user terminal, and a server acting as the estimation device, the estimation device alone can estimate a presence or absence of bone marrow edema in body part of a subject captured in an X-ray image. In this case, the estimation device may be provided with, for example, an input unit that receives operating input and a display unit that displays the estimation result in addition to the above storage unit, control unit, and the like, and further may be provided with a reading unit that reads a portable storage medium such as a CD-ROM, DVD-ROM, or flash memory. Such an estimation device can load and use a previously acquired X-ray image from an external source, and can also output an estimation result to the display unit.

(Modification)

The first embodiment above illustrates an example in which only X-ray images of body part and information about whether or not bone marrow edema is present in body part captured in each of the X-ray images are used as the training data, but the present invention is not limited thereto, and any information other than the above can be included as the training data. For example, information pertaining to the patient with body part (such as age, sex, weight, height, blood analysis, urinalysis, presence or absence of pain) can be included. By using such training data can be used to train learner 321 and inputting information pertaining to the subject (such as age, sex, weight, height, blood analysis, urinalysis, presence or absence of pain) into trained learner 321 in addition to an X-ray image of body part of the subject, a more accurate estimation result can be obtained.

Second Embodiment

One aspect of the present invention is a program capable of executing the estimation method of the present invention described above on a computer. The above descriptions of the estimation device and the estimation method are also applied in the present embodiment.

Such a program is a program causing a computer to function as a learner that has been trained using training data including X-ray images of body part and information about whether or not bone marrow edema is present in body part captured in each of the X-ray images; here, the trained learner accepts an X-ray image of body part of a subject as input, and outputs an estimation result regarding a presence or absence of bone marrow edema in body part captured in the inputted X-ray image.

In addition, the program of the present embodiment may also be recorded onto a computer-readable storage medium, for example. Random access memory (RAM), read-only memory (ROM), a hard disk (HD), an optical disc, a floppy(R) disk (FD) or the like can be used as the storage medium.

EXAMPLES

Example 1

According to the present invention, as described above, a presence or absence of bone marrow edema (LME) can be estimated from an X-ray image of a joint or the like by using a machine learning program (algorithm). In this Example, a trained model is created using training data containing X-ray images (plain X-ray radiographic images) of joints of hands labeled as BME or non-BME, and the performance of the trained model is evaluated.

<Methodology>

A neural network including convolutional layers and fully connected layers is used to classify X-ray images. The network design is illustrated in FIG. 5. The input of the network is an image (X-ray image) with a resolution of 224×224 pixels. The original images are saved in JPEG format and have a size of about 800×450 pixels. Because the original images are not uniform in size, the images are resized to 224×224 pixels. The convolutional neural network in FIG. 5 contains three convolution blocks ("Conv") and three fully connected layers ("FC"). Each convolution block consists of a 2D convolutional layer ("Conv2d"), a leaky ReLU activation layer ("Leaky Relu"), a max pooling layer ("Maxpooling"), and a batch normalization layer ("BN"). The numerals above each "Conv" in FIG. 5 denote kernel size, kernel size, and kernel number. The numeral above each "FC" denotes the number of neurons. The last layer is a softmax layer ("Softmax") that can output the probability of each category. The output is the score of BME and is the probability of BME in the range from 0 to 1.

The neural network is trained for 200 epochs with an Adam optimizer. Binary cross-entropy is used for the loss function. The loss function is weighted to allow for minor categories to play a more influential role in the training process. To be specific, if the number of BME samples is n times the number of non-BME samples, the loss from non-BME samples is multiplied by the factor of n.

<Experiment>

Figure 6:
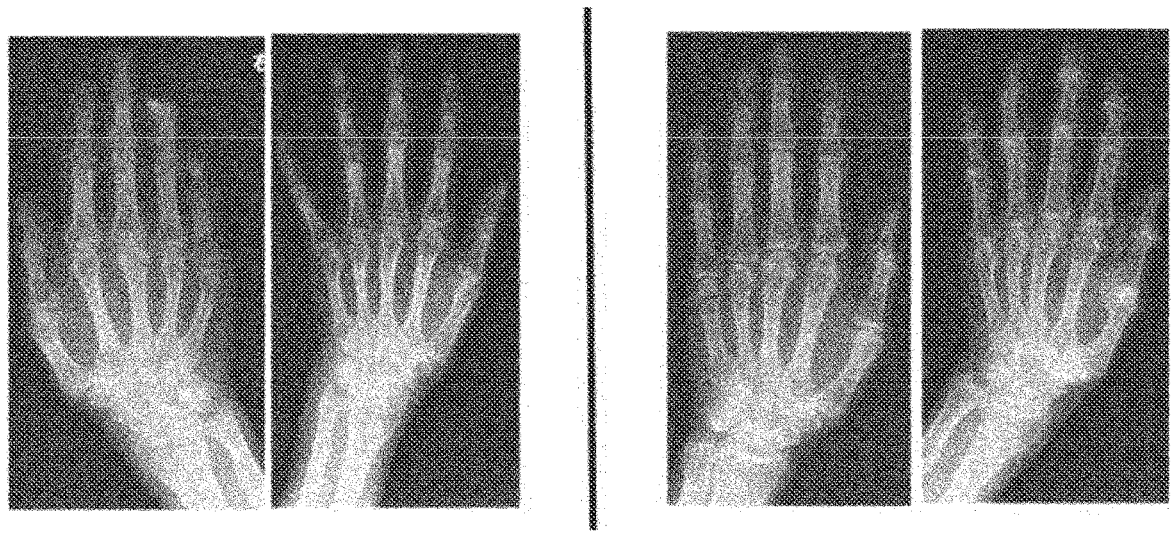
FIG. 6 is an example of X-ray images of hands in Example 1.

The original data consists of 577 X-ray images of hands. Of these, 450 are free of BME and the remaining 127 contain BME. Here, BME is observable only with an MRI. Each X-ray image is labeled by a medical doctor using a corresponding MRI diagnosis result. FIG. 6 illustrates an example of BME images and non-BME images. The two images on the left are BME cases, and the two images on the right are non-BME cases. Swelling in soft tissue and unclear margin of bone cortex are usually seen in early BME cases.

Regarding data split, 104 images including 79 non-BME images and 25 BME images are used as a hold-out test set. The remaining 473 images are used as training data and validation data. Five-fold cross-validation is used for these 473 images. For each fold, there are about 378 images including 297 non-BME images and 81 BME images in the training set, and there are about 95 images including 74 non-BME images and 21 BME images in the validation set. In order to fully utilize every image and unify the distribution of the training set and the validation set, the ratio of non-BME images and BME images is controlled to be about 3.66:1.

Here, the dataset is augmented by flips and rotations. The data generator function from Keras is used so that every image selected will flip by chance. The flip augmentation includes a horizontal flip and a vertical flip. The rotation augmentation is handled offline. Each image is rotated clockwise by 5 degrees and 10 degrees, and rotated counterclockwise similarly. Through rotation augmentation, the data set is enlarged to five times the original number of images.

ROC curve, precision rate, and recall rate are used to evaluate the performance of the model. Since the dataset is imbalanced at the ratio of 3.66:1, it is meaningless to use overall accuracy to evaluate the model performance. Predicting every image as non-BME yields an overall accuracy of 78.5%, which is misleading. Accordingly, ROC curve, precision rate, and recall rate are applied instead of overall accuracy to evaluate the performance of the neural network. An overview of these evaluation criteria is given below.

In this model, the final output is a score of BME, which means the possibility of BME. For this binary classification task, a threshold value is selected. If the output score exceeds the threshold value, the image is regarded as BME. To choose a threshold value, the f-measure were calculated for thresholds from 0.1 to 0.9, and 0.4 was selected as the threshold value since its f-measure was the highest.

Also, an ROC curve is created. The ROC curve is broadly used to grasp the classification performance of each threshold value. The ROC curve takes 1—specificity (corresponding to the false positive rate (FPR)) as the x axis and sensitivity (corresponding to the true positive rate (TPR)) as the y axis. For every threshold value, the confusion matrix illustrated in Table 1 below is created, and the true positive rate (TPR) and false positive rate (FPR) are calculated on the basis of the expressions below.

TABLE 1

| | | Predicted label | |
| --- | --- | --- | --- |
| | | BME | Non-BME |
| Real label | BME | True positive | False negative |
| | Non-BME | False positive | True negative |

$$TPR = TP/(TP+FN) \quad \text{(Expression 1)}$$

$$FPR = FP/(FP+TN) \quad \text{(Expression 2)}$$

The term TP/TN stands for the number of true positives/true negatives (meaning that positive/negative is predicted correctly), and similarly, the term FP/FN stands for the number of false positives/false negatives (meaning that positive/negative is predicted incorrectly).

Each threshold value corresponds to a point on the ROC curve. The ROC curve indicates the overall capability of the network at every threshold value. Otherwise, the precision rate and recall rate at an optimal threshold value indicate the best performance of the model. The precision is calculated on the basis of expression 3 below. The recall rate is calculated similarly to the true positive rate (expression 4).

Precision rate=$TP/(FP+TP)$ (Expression 3)

Recall rate=$TP/(TP+FN)$ (Expression 4)

Figure 7:
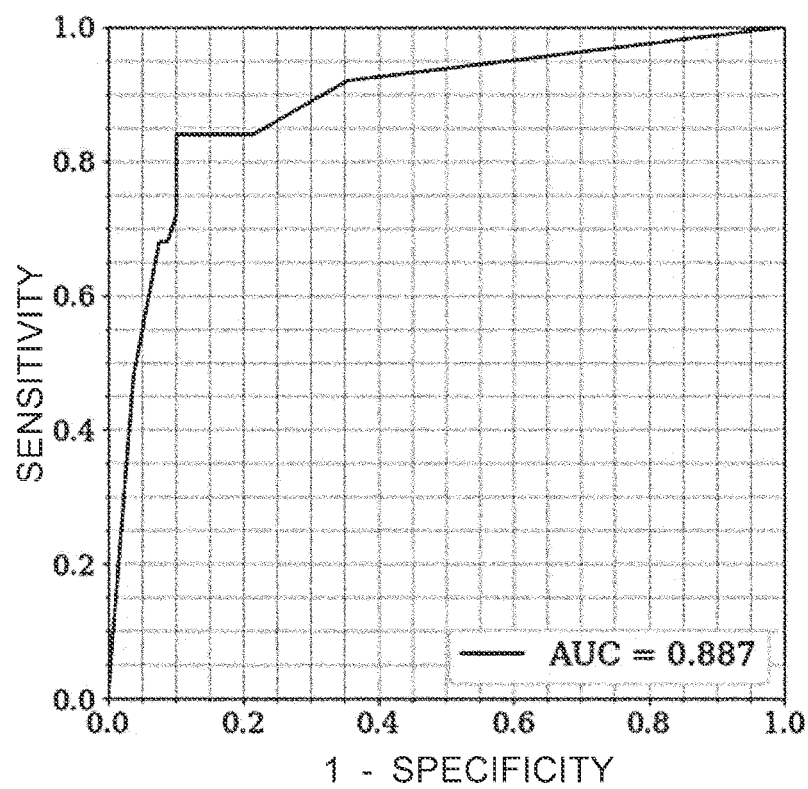
FIG. 7 is a graph illustrating an ROC curve in Example 1.

Table 2 below indicates the test results of the precision rate and recall rate (threshold value=0.4). As in Table 2, five-fold shows similar performance with respect to the hold-out test set. FIG. 7 illustrates the ROC curve of fold five. Here, AUC denotes the area under the ROC curve, and as in Table 2, AUC, which indicates the general performance of the model, ranged from 0.73 to 0.79. Also, the average precision rate is 63% and the average recall rate is 87%.

TABLE 2

|  | Precision | Recall | AUC |
|---|---|---|---|
| Fold 1 | 0.64 | 0.80 | 0.89 |
| Fold 2 | 0.62 | 0.92 | 0.91 |
| Fold 3 | 0.59 | 0.92 | 0.88 |
| Fold 4 | 0.59 | 0.88 | 0.89 |
| Fold 5 | 0.72 | 0.84 | 0.89 |
| Average | 0.63 | 0.87 | 0.89 |

<Discussion>

As above, in Example 1, X-ray images and MRI-based labels are used to design a binary classification task between BME and non-BME. Also, upon evaluation, the result is much better than random guessing. According to these results, there should be a difference to some degree between BME images and non-BME images, which indicates that machine learning can be used to infer a presence or absence of bone marrow edema (BME) from X-ray images.

The foregoing describes the present invention with reference to embodiments and Examples, but the present invention is not limited to the above embodiments and Examples, and various modifications are possible without departing from the gist of the present invention.

INDUSTRIAL APPLICABILITY

According to the present invention, it is possible to estimate whether or not bone marrow edema is present in body part of a subject on the basis of an X-ray image of body part of the subject, without conducting an examination using an MRI machine, and therefore the present invention can be used favorably to assist with diagnosis of bone marrow edema.

REFERENCE SIGNS LIST

1: X-ray imaging device
2: User terminal
3: Server
4: Communication network
10: Estimation system
31: Communication unit
32: Storage unit
33: Control unit
321: Learner
322: X-ray image DB

The invention claimed is:

1. An estimation device comprising:
   a learner that has been trained using training data including X-ray images of body part and information about whether or not bone marrow edema is present in body part captured in each of the X-ray images, wherein
   the estimation device inputs an X-ray image of body part of a subject into the learner, and causes the learner to output an estimation result related to a presence or absence of bone marrow edema in body part captured in the inputted X-ray image.

2. The estimation device according to claim 1, wherein the body part is a joint of hand.

3. The estimation device according to claim 1, wherein the bone marrow edema is bone marrow edema associated with rheumatoid arthritis.

4. The estimation device according to claim 1, further comprising a visualization unit that analyzes an internal state of the learner and outputs an image visualizing a region of suspected abnormality in the inputted X-ray image.

5. A method for estimating a presence or absence of bone marrow edema in body part captured in an X-ray image, the method comprising:
   an estimating step of inputting an X-ray image of body part of a subject into a learner that has been trained using training data including X-ray images of body part and information about whether or not bone marrow edema is present in body part captured in each of the X-ray images, and causing the learner to output an estimation result related to a presence or absence of bone marrow edema in body part captured in the inputted X-ray image.

6. The method according to claim 5, further comprising a visualizing step of analyzing an internal state of the learner and outputting an image visualizing a region of suspected abnormality in the inputted X-ray image.

7. A non-transitory computer-readable storage medium storing a program causing a computer to function as:
   a learner that has been trained using training data including X-ray images of body part and information about whether or not bone marrow edema is present in body part captured in each of the X-ray images, wherein
   the trained learner accepts an X-ray image of body part of a subject as input, and outputs an estimation result related to a presence or absence of bone marrow edema in body part captured in the inputted X-ray image.

8. A generation method for generating a trained learner that can estimate a presence or absence of bone marrow edema in body part captured in an X-ray image, the generation method comprising:
   a training step of training the learner using training data including X-ray images of body part and information about whether or not bone marrow edema is present in body part captured in each of the X-ray images.

* * * * *